(12) United States Patent
Seidel et al.

(10) Patent No.: US 7,067,567 B2
(45) Date of Patent: Jun. 27, 2006

(54) IMPACT-MODIFIED POLYCARBONATE BLENDS

(75) Inventors: Andreas Seidel, Dormagen (DE); Thomas Eckel, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 319 days.

(21) Appl. No.: 10/627,163

(22) Filed: Jul. 25, 2003

(65) Prior Publication Data

US 2004/0132877 A1    Jul. 8, 2004

(51) Int. Cl.
 *C08L 69/00*    (2006.01)
 *C08K 5/5333*    (2006.01)
 *C08K 5/523*    (2006.01)

(52) U.S. Cl. ............... 523/201; 524/123; 524/125; 524/127

(58) Field of Classification Search ............ None
See application file for complete search history.

(56) References Cited

U.S. PATENT DOCUMENTS

| | | | |
|---|---|---|---|
| 4,888,388 A | 12/1989 | Hongo et al. | 525/67 |
| 5,030,675 A | 7/1991 | Wittmann et al. | 524/130 |
| 5,871,570 A * | 2/1999 | Koyama et al. | 106/18.18 |
| 6,174,943 B1 | 1/2001 | Matsumoto et al. | 524/115 |
| 6,441,068 B1 * | 8/2002 | Eckel et al. | 524/127 |
| 6,569,930 B1 * | 5/2003 | Eckel et al. | 524/127 |
| 6,590,015 B1 | 7/2003 | Eckel et al. | 524/127 |
| 6,740,696 B1 * | 5/2004 | Gaggar et al. | 524/127 |
| 6,815,476 B1 * | 11/2004 | Bhatia et al. | 524/127 |

FOREIGN PATENT DOCUMENTS

| | | |
|---|---|---|
| EP | 594021 A2 * | 4/1994 |
| EP | 0 992 542 | 4/2000 |
| JP | 4-345657 | 12/1992 |
| JP | 6-239965 | 8/1994 |
| JP | 8-73692 | 3/1996 |
| JP | 2001-31860 | 2/2001 |
| WO | 94/11429 | 5/1994 |

OTHER PUBLICATIONS

JPO machine translation of JP 08-073692-A (Koyama et al.).*
Obtained translation of Tables of JP 08-073692-A (Koyama et al.).*

* cited by examiner

*Primary Examiner*—Matthew A. Thexton
(74) *Attorney, Agent, or Firm*—Joseph C. Gil; Aron Preis

(57) ABSTRACT

A thermoplastic molding composition having improved flammability rating and mechanical properties is disclosed. The composition contains aromatic polycarbonate having a weight-average molecular weight $M_w \geq 25,000$ g/mol., polyalkylene terephthalate, graft (co)polymer characterized in that its grafted phase includes structural units derived from acrylate monomers, an oligomeric organic phosphoric acid ester, and an optional fluorinated polyolefin. In a preferred embodiment the graft (co)polymer is characterized in its core-shell morphology.

20 Claims, No Drawings

IMPACT-MODIFIED POLYCARBONATE BLENDS

FIELD OF THE INVENTION

The invention concerns thermoplastic molding compositions and in particular, compositions containing poly(ester) carbonate.

SUMMARY OF THE DISCLOSURE

A thermoplastic molding composition having improved flammability rating and mechanical properties is disclosed. The composition contains aromatic polycarbonate having a weight-average molecular weight $M_w \geq 25,000$ g/mol., polyalkylene terephthalate, graft (co)polymer characterized in that its grafted phase includes structural units derived from acrylate monomers, an oligomeric organic phosphoric acid ester, and an optional fluorinated polyolefin. In a preferred embodiment the graft (co)polymer is characterized in its core-shell morphology.

BACKGROUND OF THE INVENTION

Impact-modified blends of polycarbonate and aromatic polyesters are known.

U.S. Pat. No. 4,888,388, for example, describes compositions of polycarbonate, polyethylene terephthalate and a graft polymer based on a silicone-butyl acrylate composite rubber, which compositions are distinguished by improved low-temperature strength. Flame-resistant molding compositions are not described.

Impact-modified blends of polycarbonate and aromatic polyesters which have been rendered flame-resistant are also known.

JP 04 345 657-A2 describes mixtures of halogenated aromatic polycarbonate, aromatic polyesters and graft polymers based on silicone-acrylate composite rubbers. The molding compositions described in JP 06 239 965-A are also based on flameproofing additives containing halogen. In addition to aromatic polycarbonate and aromatic polyesters, they contain graft polymers based on silicone-acrylate composite rubbers, and halogenated epoxy resins. The molding compositions described in WO 94/11429 contain polycarbonate, polyester and a halogenated aryl phosphate as flameproofing additive. Also described are compositions that additionally contain methacrylate/butadiene/styrene elastomers having a core-shell structure.

Because molding compositions rendered flame-resistant with halogen-containing additives can cause corrosion of the tool during processing owing to the liberation of halogen-containing gases, and because they liberate corrosive hydrogen halides which are damaging to health during combustion, it is desirable to develop molding compositions that are rendered flame-resistant without halogens.

Impact-modified blends of polycarbonate and aromatic polyesters which have been rendered flame-resistant without halogens are also known.

JP 2001 031 860-A describes compositions which have high impact strength, resistance to chemicals and hydrolytic stability and which contain polycarbonate, a mixture of polyethylene terephthalate and polybutylene terephthalate, a graft elastomer having a core-shell structure, a silicate salt and, as flameproofing additive, stabilised red phosphorus and polytetrafluoroethylene (PTFE). Such molding compositions have inadequate strength for many applications and cannot be adjusted to light colours as are required by the IT industry, for example for casings for monitors, printers, etc.

U.S. Pat. No. 5,030,675 describes molding compositions of polycarbonate, polyalkylene terephthalate, emulsion-ABS graft polymers, phosphorous compounds as flameproofing additive and fluorinated polyolefins as antidripping agent. The molding compositions are distinguished by improved weld line strength but have a comparatively low level of impact strength. Furthermore, the flameproofing additives that are used have a tendency to bleed, which can lead to considerable disruptions to the processing operations.

The problem of the volatility of the flameproofing additive is solved by the use of oligomeric phosphoric acid esters, as is described in EP-A 0 594 021. The PC/ABS compositions described therein contain polyalkylene terephthalate as well as oligophosphoric acid esters and fluorinated polyolefin as flameproofing additive and exhibit good notched impact strength and stress cracking resistance, as well as high dimensional stability under heat and a fault-free surface quality. However, they generally exhibit inadequate weld line strength and a disadvantageous processing window, i.e. there is a marked impairment of important properties, for example resistance to chemicals, at higher processing temperatures.

The compositions described in EP-A 0 829 517, EP-A 0 884 366 and JP 08 073 692-A are also rendered flame-resistant with oligophosphoric acid esters. In addition to the flameproofing agent and optional further additives, the PC/PET molding compositions described therein contain a graft polymer having methyl methacrylate in the graft shell. MBS and MMA-grafted polybutadiene rubber are described as examples of such graft polymers. The molding compositions described in those documents are distinguished inter alia by improved resistance to chemicals and oils.

The object of the present invention was to provide compositions which are distinguished by a combination of excellent mechanical performance, i.e. high notched impact strength, weld line strength, elongation at tear in the tensile test and stress cracking resistance under the action of chemicals, flame resistance down to thin wall thicknesses as well as good processability by the injection molding method, i.e. a large processing window.

DETAILED DESCRIPTION OF THE INVENTION

It has been found that compositions containing aromatic poly(ester) carbonate having a weight-average molecular weight $M_w \geq 25,000$ g/mol., polyalkylene terephthalate, graft copolymer having a core-shell structure and a content of acrylate monomers in the graft shell of at least 20 wt. %, and an oligomeric organic phosphoric acid ester exhibit the desired property profile.

Accordingly, the present invention provides compositions containing

A) from 40 to 90 parts by weight, preferably from 50 to 80 parts by weight, especially from 60 to 80 parts by weight, of aromatic poly(ester) carbonate having a weight-average molecular weight $M_w \geq 25,000$ g/mol., preferably $\geq 26,000$ g/mol., B) from 0.5 to 12 parts by weight, preferably from 1 to 12 parts by weight, particularly preferably from 3 to 10 parts by weight, most preferably from 5 to 10 parts by weight, of polyalkylene terephthalate, preferably polyethylene terephthalate, especially having an intrinsic viscosity $IV \leq 0.8$ cm$^3$/g, C) from 1 to 20 parts by weight, preferably from 2 to 15 parts by weight, especially from 3 to 12 parts by weight, most preferably from 5 to 10 parts by weight, of a graft (co)polymer, preferably having a core-shell morphology, that contains 10 to 90 wt. %, preferably from 30 to 80 wt. %, especially from 50 to 80 wt. % (based on the graft (co)polymer), of a particulate polymer having a glass transition temperature below 0° C., preferably below –20° C., especially below –40° C., as graft base and from 90 to 10 wt. %, preferably from 70 to 20 wt. %, especially from 50 to 20 wt. % (based on the graft (co)polymer), of vinyl monomers as graft monomers, the graft monomers containing an amount of at least 20 wt. %, preferably at least 50 wt. %, especially at least 75 wt. % (based on the graft monomers), of acrylate monomers, D) from 2 to 20 parts by weight, preferably from 5 to 15 parts by weight, particularly preferably from 7 to 15 parts by weight, most preferably from 10 to 15 parts by weight, of an oligomeric organic phosphoric acid ester, especially such an ester based on bisphenol A, E) from 0 to 1 part by weight, preferably from 0.1 to 0.5 part by weight, especially from 0.2 to 0.5 part by weight, of fluorinated polyolefin, and F) from 0 to 10 parts by weight, preferably from 0.1 to 5 parts by weight, of at least one conventional functional polymer additive, the sum of the parts by weight of all the components being 100.

The compositions according to the invention particularly preferably contain no halogen-containing compounds such as, for example, aromatic polycarbonates based on halogenated bisphenols or epoxy resins.

Component A

Aromatic polycarbonates and/or aromatic polyester carbonates which are suitable according to the invention as component A are known in the literature or may be prepared by processes which are known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see, for example, DE-A 3 077 934 all incorporated herein by reference).

The preparation of aromatic polycarbonates may be carried out, for example, by melting processes or by reacting diphenols with carbonic acid halides, preferably phosgene, and/or with aromatic dicarboxylic acid dihalides, preferably benzenedicarboxylic acid dihalides, by the phase boundary process, optionally using chain terminators, for example monophenols, and optionally using branching agents having a functionality of three or more, for example triphenols or tetraphenols.

Diphenols for the preparation of aromatic polycarbonates and/or aromatic polyester carbonates are preferably those of formula (I)

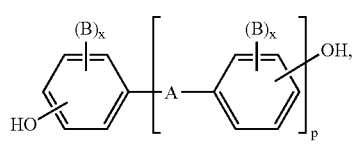

(I)

wherein
A represents a single bond, $C_1$- to $C_5$-alkylene, $C_2$- to $C_5$-alkylidene, $C_5$- to $C_6$-cycloalkylidene, —O—, —SO—, —CO—, —S—, —SO_2$—, $C_6$-to $C_{12}$-arylene, to which there may be condensed other aromatic rings optionally containing hetero atoms,
or a radical of formula (II) or (III)

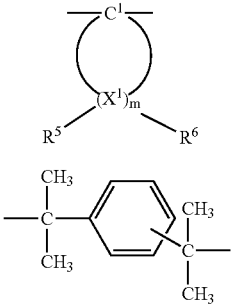

(II)

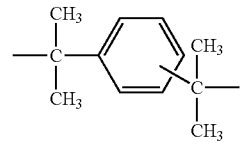

(III)

each of the substituents B represents $C_1$- to $C_{12}$-alkyl, preferably methyl, the substituents x are each independently of the other 0, 1 or 2, p represents 1 or 0, and $R^5$ and $R^6$ are selected individually for each $X^1$ and are each independently of the other hydrogen or $C_1$- to $C_6$-alkyl, preferably hydrogen, methyl or ethyl, $X^1$ represents carbon, and m represents an integer from 4 to 7, preferably 4 or 5, with the proviso that on at least one atom $X^1$, $R^5$ and $R^6$ are simultaneously alkyl Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxyphenyl)-diisopropyl-benzenes.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone. Special preference is given to 2,2-bis-(4-hydroxyphenyl)-propane (bisphenol A).

The diphenols may be used individually or in the form of any desired mixtures. The diphenols are known in the literature or obtainable by processes known in the literature.

Suitable chain terminators for the preparation of thermoplastic aromatic polycarbonates are, for example, phenol, p-chlorophenol, p-tert.-butylphenol, as well as long-chained alkylphenols, such as 4-(1,3-tetramethylbutyl)-phenol according to DE-A 2 842 005, or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally from 0.5 mol. % to 10 mol. %, based on the molar sum of the diphenols used in a particular case.

The thermoplastic aromatic polycarbonates may be branched in a known manner, preferably by the incorporation of from 0.05 to 2.0 mol. %, based on the sum of the diphenols used, of compounds having a functionality of three or more, for example compounds having three or more phenolic groups.

Both homopolycarbonates and copolycarbonates are suitable. For the preparation of copolycarbonates according to the invention as component A, from 1 to 25 wt. %, preferably from 2.5 to 25 wt. %, based on the total amount of diphenols to be used, of polydiorganosiloxanes having hydroxy-aryloxy terminal groups may also be used. Those compounds are known (U.S. Pat. No. 3,419,634) and may be prepared by processes known in the literature. The preparation of copoly-carbonates containing polydiorganosiloxanes is described in DE-A 3 334 782.

In addition to the homopolycarbonates of bisphenol A, preferred polycarbonates are the copolycarbonates of bisphenol A containing up to 15 mol. %, based on the molar sum of diphenols, of diphenols other than those mentioned as being preferred or particularly preferred.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Particular preference is given to mixtures of the diacid dichlorides of isophthalic acid and terephthalic acid in a ratio of from 1:20 to 20:1.

In the preparation of polyester carbonates, a carbonic acid halide, preferably phosgene, is additionally used concomitantly as bifunctional acid derivative.

In addition to the monophenols mentioned above as chain terminators for the preparation of the aromatic polyester carbonates also suitable are the chlorocarbonic acid esters of the mentioned monophenols and the acid chlorides of aromatic monocarboxylic acids, which may optionally be substituted by $C_1$- to $C_{22}$-alkyl groups, as well as aliphatic $C_2$- to $C_{22}$-monocarboxylic acid chlorides.

The amount of chain terminators is in each case from 0.1 to 10 mol. %, based in the case of phenolic chain terminators on moles of diphenol and in the case of monocarboxylic acid chloride chain terminators on moles of dicarboxylic acid dichlorides.

The aromatic polyester carbonates may also contain aromatic hydroxycarboxylic acids incorporated therein.

The aromatic polyester carbonates may be either linear or branched in a known manner (see in that connection DE-A 2 940 024 and DE-A 3 007 934).

There may be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol. % (based on dicarboxylic acid dichlorides used), or phenols having a functionality of three or more, such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methylbenzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxy-triphenyl)-methyl]-benzene, in amounts of from 0.01 to 1.0 mol. %, based on diphenols used. Phenolic branching agents may be placed in the reaction vessel with the diphenols, acid chloride branching agents may be introduced together with the acid dichlorides.

The content of carbonate structural units in the thermoplastic aromatic polyester carbonates may vary as desired. The carbonate group content is preferably up to 100 mol. %, especially up to 80 mol. %, particularly preferably up to 50 mol. %, based on the sum of ester groups and carbonate groups. Both the esters and the carbonates contained in the aromatic polyester carbonates may be present in the polycondensation product in the form of blocks or in a randomly distributed manner.

The thermoplastic aromatic poly(ester) carbonates have weight-average molecular weights ($M_w$, measured by gel permeation chromatography) of $\geq 25,000$, preferably $\geq 26,000$. According to the present invention there are preferably used poly(ester) carbonates having a weight-average molecular weight of up to 35,000, preferably up to 32,000, particularly preferably up to 30,000 g/mol.

The thermoplastic aromatic poly(ester) carbonates may be used alone or in any desired mixture.

Component B

The polyalkylene terephthalates as component B are reaction products of aromatic dicarboxylic acids or reactive derivatives thereof, such as dimethyl esters or anhydrides, and aliphatic, cycloaliphatic or araliphatic diols, and mixtures of those reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 mol. %, based on the diol component, of ethylene glycol and/or 1,4-butanediol radicals.

The preferred polyalkylene terephthalates may contain, in addition to terephthalic acid radicals, up to 20 mol. %, preferably up to 10 mol. %, of radicals of other aromatic or cycloaliphatic dicarboxylic acids having from 8 to 14 carbon atoms or aliphatic dicarboxylic acids having from 4 to 12 carbon atoms, such as radicals of phthalic acid, isophthalic acid, naphthalene-2,6-dicarboxylic acid, 4,4'-diphenyl-dicarboxylic acid, succinic acid, adipic acid, sebacic acid, azelaic acid, cyclohexanediacetic acid.

The preferred polyalkylene terephthalates may contain, in addition to ethylene glycol or 1,4-butanediol radicals, up to 20 mol. %, preferably up to 10 mol. %, of other aliphatic diols having from 3 to 12 carbon atoms or cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, cyclohexane-1,4-dimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxypropoxy-phenyl)-propane (DE-A 2 407 674, 2 407 776, 2 715 932).

The polyalkylene terephthalates may be branched by the incorporation of relatively small amounts of tri- or tetrahydric alcohols or tri- or tetra-basic carboxylic acids, for example according to DE-A 1 900 270 and U.S. Pat. No. 3,692,744. Examples of preferred branching agents are trimesic acid, trimellitic acid, trimethylol-ethane and -propane and pentaerythritol.

Particular preference is given to polyethylene terephthalates and/or polybutylene terephthalates, with polyethylene terephthalate being especially preferred. Particular preference is given to the use of polyalkylene terephthalates having a high tendency to crystallise. Such polyalkylene terephthalates are characterised in that the isothermal crystallisation time, determined by the method indicated in the Examples section, is preferably <20 minutes, particularly preferably <10 minutes, especially <7 minutes.

The polyalkylene terephthalates preferably have an intrinsic viscosity of $\leq 0.8$ cm$^3$/g, measured in phenol/o-dichlorobenzene (1:1 parts by weight) at 25° C. using an Ubbelohde viscometer; in general, the intrinsic viscosity of the polyalkylene terephthalates is greater than 0.3 cm$^3$/g, especially greater than 0.4 cm$^3$/g.

The polyalkylene terephthalates may be prepared by known methods (e.g. Kunststoff-Handbuch, Volume VIII, p. 695 et seq., Carl-Hanser-Verlag, Munich 1973).

Component C

Suitable graft bases C.1 for the graft polymers C include diene rubbers, EP(D)M rubbers (rubbers based on ethylene/propylene and optionally diene compounds) acrylate, polyurethane, silicone, chloroprene and ethylene/vinyl acetate rubbers as well as silicone-acrylate composite rubbers.

Preference is given to diene rubbers, silicone rubbers and silicone-acrylate composite rubbers. Silicone-acrylate composite rubbers are particularly preferred.

Rubbers preferably suitable as the graft base C.1 are diene rubbers, for example those based on butadiene or isoprene, or mixtures of diene rubbers or copolymers of diene rubbers or mixtures thereof with further copolymerizable monomers. Preferred copolymerizable monomers are vinyl monomers selected from the group of the vinyl aromatic compounds, vinyl aromatic compounds substituted on the ring (such as, for example, styrene, α-methylstyrene, p-methylstyrene), methacrylic acid ($C_1$–$C_8$)-alkyl esters (such as methyl methacrylate, ethyl methacrylate), acrylic acid ($C_1$–$C_8$)-alkyl esters (such as n-butyl acrylate and tert.-butyl acrylate or mixtures thereof), vinyl cyanides (unsaturated nitriles, such as acrylonitrile and methacrylonitrile) and derivatives of unsaturated carboxylic acids, such as anhydrides and imides (for example maleic anhydride and N-phenyl maleimide).

Pure polybutadiene rubber is particularly preferred.

Such graft bases generally have a median particle size ($d_{50}$ value) of from 0.05 to 5 μm, preferably from 0.1 to 2 μm, especially from 0.1 to 1 μm. The median particle size $d_{50}$ is the diameter above and below which in each case 50 wt. % of the particles lie. It may be determined by ultracentrifuge measurement (W. Scholtan, H. Lange, Kolloid, Z. und Z. Polymere 250 (1972), 782–1796).

The gel content of those graft bases is at least 30 wt. %, preferably at least 40 wt. % (measured in toluene).

The gel content is determined at 25° C. in a suitable solvent (M. Hoffmann, H. Krömer, R. Kuhn, Polymeranalytik I und II, Georg Thieme-Verlag, Stuttgart 1977).

Suitable graft bases C.1 for the graft polymers having the preferred core-shell structure C are particularly preferably those acrylate rubbers, silicone rubbers or silicone-acrylate composite rubbers which contain from 0 to 100 wt. %, preferably from 1 to 99 wt. %, especially from 10 to 99 wt. %, particularly preferably from 30 to 99 wt. %, polyorganosiloxane component and from 100 to 0 wt. %, preferably from 99 to 1 wt. %, especially from 90 to 1 wt. %, particularly preferably from 70 to 1 wt. %, polyalkyl (meth) acrylate rubber component (the total amount of the rubber component in question is 100 wt. %).

Such rubbers preferably have a median particle diameter of from 0.01 to 0.6 μm.

As preferred silicone acrylate rubbers there are used those whose production is described in JP 08 259 791-A, JP 07 316 409-A and EP-A 0 315 035. The relevant contents of those Applications are hereby incorporated into this Application.

The polyorganosiloxane component in the silicone acrylate composite rubber may be prepared by reacting an organosiloxane and a multifunctional crosslinker in an emulsion polymerization process. It is also possible to insert graft-active sites into the rubber by addition of suitable unsaturated organosiloxanes.

The organosiloxane is generally cyclic, the ring structures preferably containing from 3 to 6 Si atoms. Examples which may be mentioned include hexamethyl-cyclotrisiloxane, octamethylcyclotetrasiloxane, decamethylcyclopentasiloxane, dodecamethylcyclohexasiloxane, trimethyltriphenylcyclotrisiloxane, tetramethyl-tetraphenylcyclotetrasiloxane, octaphenylcyclotetrasiloxane, which may be used alone or in a mixture of 2 or more compounds. The organosiloxane component should be involved in the constitution of the silicone component in the silicone acrylate rubber to the extent of at least 50 wt. %, preferably at least 70 wt. %, based on the silicone component in the silicone acrylate rubber.

As crosslinkers there are generally used tri- or tetrafunctional silane compounds. The following may be mentioned as particularly preferred examples thereof: trimethoxymethylsilane, triethoxyphenylsilane, tetramethoxysilane, tetraethoxy-silane, tetra-n-propoxysilane, tetrabutoxysilane. Tetrafunctional branching agents, especially tetraethoxysilane. The amount of branching agents is generally from 0 to 30 wt. % (based on the polyorganosiloxane component in the silicone acrylate rubber).

In order to introduce graft-active sites into the polyorganosiloxane component of the silicone acrylate rubber, there are preferably used compounds which form one of the following structures:

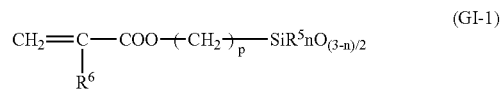

(GI-1)

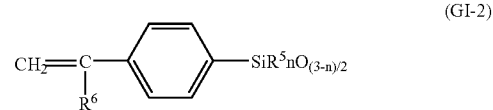

(GI-2)

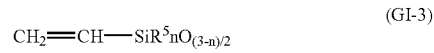

(GI-3)

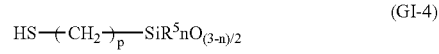

(GI-4)

wherein $R^5$ represents methyl, ethyl, propyl or phenyl, $R^6$ represents hydrogen or methyl, n represents 0, 1 or 2, and p represents a number from 1 to 6.

(Meth)acryloyloxysilane is a preferred compound for forming the structure (GI 1). Preferred (meth)acryloyloxysilanes are, for example, β-methacryloyloxyethyl-dimethoxymethyl-silane, γ-methacryloyl-oxy-propylmethoxy-dimethyl-silane, γ-methacryloyloxypropyl-dimethoxy-methyl-silane, γ-methacryloyloxypropyl-tri-methoxy-silane, γ-methacryloyloxy-propyl-ethoxy-diethyl-silane, γ-methacryloyl-oxypropyl-diethoxy-methyl-silane, γ-methacryloyloxy-butyl-diethoxy-methyl-silane.

Vinylsiloxanes, especially tetramethyl-tetravinyl-cyclotetrasiloxane, are suitable for forming the structure GI-2.

p-Vinylphenyl-dimethoxy-methylsilane, for example, is able to form structure GI-3. γ-Mercaptopropyldimethoxy-methylsilane, γ-mercaptopropylmethoxy-dimethylsilane, γ-mercaptopropyldiethoxymethylsilane, etc. are suitable for forming structure (GI-4).

The amount of those compounds is from 0 to 10 wt. %, preferably from 0.5 to 5 wt. % (based on the polyorganosiloxane component).

The acrylate component in the silicone acrylate composite rubber may be prepared from alkyl (meth)acrylates, crosslinkers and graft-active monomer units.

Examples of preferred alkyl (meth)acrylates which may be mentioned include alkyl acrylates, such as methyl acrylate, ethyl acrylate, n-propyl acrylate, n-butyl acrylate, 2-ethylhexyl acrylate, and alkyl methacrylates, such as hexyl methacrylate, 2-ethylhexyl methacrylate, n-lauryl methacrylate, and particularly preferably n-butyl acrylate.

Multifunctional compounds are used as crosslinkers. Examples thereof which may be mentioned include: ethylene glycol dimethacrylate, propylene glycol dimethacrylate, 1,3-butylene glycol dimethacrylate and 1,4-butylene glycol dimethacrylate.

The following compounds, for example, alone or in a mixture, may be used to insert graft-active sites: allyl methacrylate, triallyl cyanurate, triallyl isocyanurate, allyl methacrylate. Allyl methacrylate may also act as crosslinker. Those compounds are used in amounts of from 0.1 to 20 wt. %, based on the acrylate rubber component in the silicone acrylate composite rubber.

Methods of producing the silicone acrylate composite rubbers which are preferably used in the compositions according to the invention, and their grafting with monomers, are described, for example, in U.S. Pat. No. 4,888,388, JP 08 259 791 A2, JP 07 316 409A and EP-A 0 315 035 all incorporated herein by reference. As graft base C.1 for the graft polymer C there are suitable both those silicone acrylate composite rubbers whose silicone and acrylate components form a core-shell structure, and those which form a network, in which the acrylate and silicone components have penetrated one another completely (interpenetrating network).

The graft polymerization onto the above-described graft bases may be carried out in suspension, dispersion or emulsion. Continuous or discontinuous emulsion polymerization is preferred. The graft polymerization is carried out with free-radical initiators (e.g. peroxides, azo compounds, hydroperoxides, persulfates, perphosphates) and optionally using anionic emulsifiers, e.g. carboxonium salts, sulfonic acid salts or organic sulfates. There are formed thereby graft polymers with high graft yields, i.e. a large proportion of the polymer of the graft monomers is bonded chemically to the rubber.

For the formation of the graft shell C.2 there are preferably used mixtures of

C.2.1 from 0 to 80 wt. %, preferably from 0 to 50 wt. %, especially from 0 to 25 wt. % (based on the graft shell), of vinyl aromatic compounds or vinyl aromatic compounds substituted on the ring (such as, for example, styrene, α-methylstyrene, p-methylstyrene), vinyl cyanides (unsaturated nitriles, such as acrylonitrile and methacrylonitrile), and C.2.2 from 100 to 20 wt. %, preferably from 100 to 50 wt. %, especially from 100 to 75 wt. % (based on the graft shell), of monomers selected from the group of the (meth)acrylic acid ($C_1$–$C_8$)-alkyl esters (such as methyl methacrylate, n-butyl acrylate, tert.-butyl acrylate) and derivatives (such as anhydrides and imides) of unsaturated carboxylic acids (such as maleic anhydride and N-phenyl maleimide).

The graft shell consists particularly preferably of a pure (meth)acrylic acid ($C_1$–$C_8$)-alkyl ester or of a mixture of a plurality of such esters, especially of pure methyl methacrylate.

Component D

There are preferably used as the FR additive oligomeric phosphoric or phosphonic acid esters of the general formula (IV)

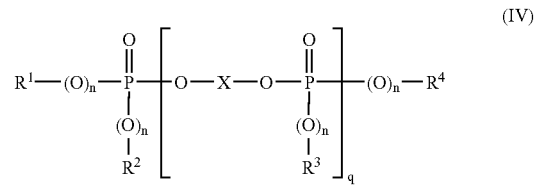

wherein
$R^1$, $R^2$, $R^3$ and $R^4$ each independently of the others represents $C_1$- to $C_8$-alkyl, or $C_5$- to $C_6$-cycloalkyl, $C_6$- to $C_{20}$-aryl or $C_7$- to $C_{12}$-aralkyl each optionally substituted by alkyl, preferably by $C_1$- to $C_4$-alkyl, each of the substituents n independently of the others represents 0 or 1, q represents from 0.5 to 30, and X represents a mono- or poly-nuclear aromatic radical having from 6 to 30 carbon atoms, or a linear or branched aliphatic radical having from 2 to 30 carbon atoms, which may be OH-substituted and may contain up to 8 ether bonds.

$R^1$, $R^2$, $R^3$ and $R^4$ each independently of the others preferably represents $C_1$- to $C_4$-alkyl, phenyl, naphthyl or phenyl-$C_1$–$C_4$-alkyl. The aromatic groups $R^1$, $R^2$, $R^3$ and $R^4$ may themselves be substituted by alkyl groups, preferably by $C_1$- to $C_4$-alkyl. Particularly preferred aryl radicals are cresyl, phenyl, xylenyl, propylphenyl or butylphenyl.

X in formula (IV) preferably represents a mono- or poly-nuclear aromatic radical having from 6 to 30 carbon atoms. It is preferably derived from diphenols of formula (I).

each of the substituents n in formula (IV), independently of the others, may be 0 or 1, preferably n is equal to 1.

q represents values of from 0.5 to 30, preferably from 0.8 to 15, particularly preferably from 1 to 5, especially from 1 to 2.

X particularly preferably represents

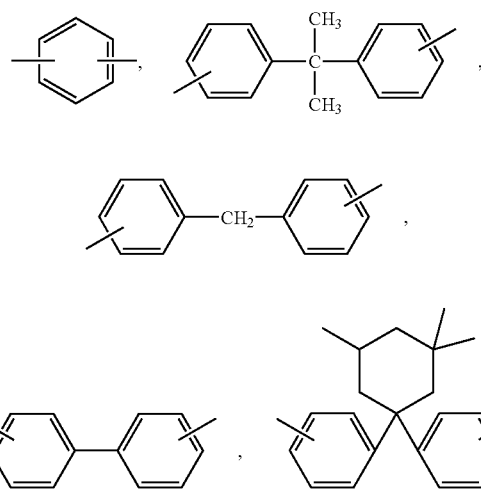

X is derived especially from resorcinol, hydroquinone, bisphenol A or diphenylphenol. X is derived particularly preferably from bisphenol A.

Further preferred phosphorus-containing compounds are compounds of formula (IVa)

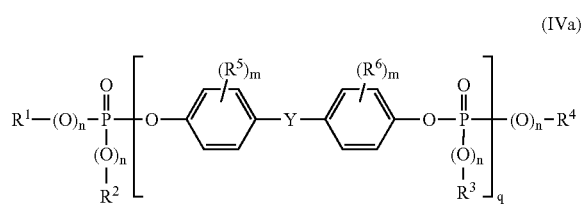

wherein
$R^1$, $R^2$, $R^3$, $R^4$, n and q are as defined for formula (IV),
each of the substituents m independently of the other represents 0, 1, 2, 3 or 4,
$R^5$ and $R^6$ each independently of the other represents $C_1$- to $C_4$-alkyl, preferably methyl or ethyl, and
Y represents $C_1$- to $C_7$-alkylidene, $C_1$–$C_7$-alkylene, $C_5$- to $C_{12}$-cycloalkylene, $C_5$- to $C_{12}$-cycloalkylidene, —O—, —S—, —$SO_2$ or —CO—, preferably isopropylidene or methylene.

Particular preference is given to

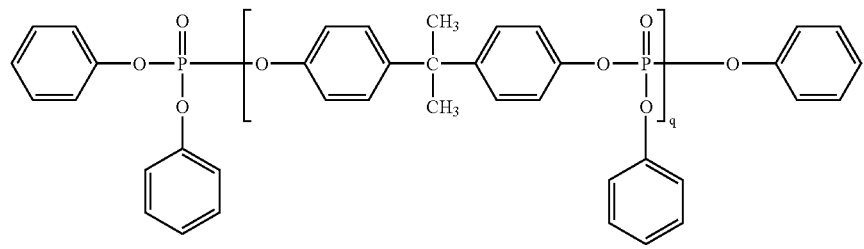

wherein q=from 1 to 2.

The phosphorus compounds according to component C are known (see, for example, EP-A 0 363 608, EP-A 0 640 655) or may be prepared by known methods in an analogous manner (e.g. Ullmanns Enzyklopädie der technischen Chemie, Vol. 18, p. 301 et seq. 1979; Houben-Weyl, Methoden der organischen Chemie, Vol. 12/1, p. 43; Beilstein Vol. 6, p. 177).

The mean q values may be determined by determining the composition of the phosphate mixture (molecular weight distribution) by means of a suitable method (gas chromatography (GC), high pressure liquid chromatography (HPLC), gel permeation chromatography (GPC)) and calculating the mean values for q therefrom.

Component E

The flameproofing agents corresponding to component D are often used in combination with so-called antidripping agents, which reduce the tendency of the material to produce burning drips in case of fire. Examples which may be mentioned are compounds of the substance classes of the fluorinated polyolefins, of the silicones, as well as aramid fibres. These may also be used in the compositions according to the invention. Fluorinated polyolefins are preferably used as antidripping agents.

Fluorinated polyolefins are known and are described, for example, in EP-A 0 640 655. They are marketed, for example, by DuPont under the trade mark Teflon® 30N.

The fluorinated polyolefins may be used either in pure form or in the form of a coagulated mixture of emulsions of the fluorinated polyolefins with emulsions of the graft polymers (component B) or with an emulsion of a vinyl-monomer-based (co)polymer, the fluorinated polyolefin being mixed in the form of an emulsion with an emulsion of the graft polymer or of the copolymer and subsequently being coagulated.

The fluorinated polyolefins may also be used in the form of a precompound with the graft polymer (component B) or with a copolymer, preferably based on vinyl monomers. The fluorinated polyolefins are mixed in the form of a powder with a powder or with granules of the graft polymer or copolymer and are compounded in the melt, generally at temperatures of from 200 to 330° C., in conventional devices such as internal kneaders, extruders or twin-shaft screws.

The fluorinated polyolefins may also be used in the form of a masterbatch, which is prepared by emulsion polymerization of at least one monoethylenically unsaturated monomer in the presence of an aqueous dispersion of the fluorinated polyolefin. Preferred monomer components are styrene, acrylonitrile, methyl methacrylate and mixtures thereof. After acid precipitation and subsequent drying, the polymer is used in the form of a pourable powder.

The coagulates, precompounds or masterbatches usually have solids contents of fluorinated polyolefin of from 5 to 95 wt. %, preferably from 7 to 80 wt. %.

The fluorinated polyolefins are used in concentrations of from 0 to 1 part by weight, preferably from 0.1 to 0.5 part by weight, especially from 0.2 to 0.5 part by weight, those amounts being based on the pure fluorinated polyolefin when a coagulate, precompound or masterbatch is used.

Component F (Further Additives)

The compositions according to the invention may also contain up to 10 parts by weight, preferably from 0.1 to 5 parts by weight, of at least one conventional polymer additive known for its utility in the context of thermoplastic molding compositions that contain poly(ester)carbonate, such as a lubricant and mold-release agent, for example pentaerythritol tetrastearate, a nucleating agent, an antistatic agent, a stabiliser, a light stabiliser, a filler and reinforcing agent, a colorant or pigment, as well as a further flame-proofing agent or a flameproofing synergist, for example an inorganic substance in nanoscale form, and/or a silicate such as talc or wollastonite.

All parts by weight in this Application are standardised so that the sum of the parts by weight of all the recited components (A through F) in the composition is 100.

The compositions according to the invention are prepared by mixing the respective constituents in a known manner and melt-compounding or melt-extruding the mixture at temperatures of from 200 to 300° C. in conventional devices such as internal kneaders, extruders and twin-shaft screws.

The individual constituents may be mixed in a known manner either in succession or simultaneously, either at about 20° C. (room temperature) or at a higher temperature.

The compositions according to the invention may be used to produce moldings of any kind. The moldings may be produced, for example, by injection molding, extrusion and blow molding methods. A further form of processing is the production of molded bodies by deep-drawing from previously produced sheets or films.

Examples of such moldings are films, profiles, casing parts of any kind, e.g. for domestic appliances such as juice extractors, coffee machines, mixers; for office equipment, such as monitors, printers, copiers; also sheets, tubes, conduits for electrical installations, profiles for the construction sector, interior finishing and external applications; parts from the field of electrical engineering, such as switches and plugs, as well as interior and exterior motor vehicle parts.

The compositions according to the invention may be used especially in the production of the following moldings, for example:

interior fittings for railway vehicles, ships, aircraft, buses and motor vehicles, hub caps, casings for electrical devices containing small transformers, casings for devices for distributing and transmitting information, casings and coverings for medical purposes, massage devices and casings therefor, toy vehicles for children, flat prefabricated wall panels, casings for security devices, rear spoilers, bodywork parts for motor vehicles, heat-insulated transport containers, devices for keeping or caring for small animals, moldings for sanitary and bathroom fittings, grids for covering ventilation openings, moldings for garden and tool sheds, casings for gardening tools.

The Examples which follow serve to illustrate the invention further.

EXAMPLES

The components mentioned in Table 1 and described briefly below were melt-compounded on a ZSK-25 at 240° C. Unless otherwise described, the test specimens were produced on an Arburg 270 E injection molding machine at 240° C.

Component A1

Linear polycarbonate based on bisphenol A having a weight-average molecular weight ($\overline{M}_w$) according to GPC of 28,000 g/mol.

Component A2

Linear polycarbonate based on bisphenol A having a weight-average molecular weight ($\overline{M}_w$) according to GPC of 26,000 g/mol.

Component A3

Linear polycarbonate based on bisphenol A having a weight-average molecular weight ($\overline{M}_w$) according to GPC of 23,000 g/mol.

Component A4

Linear polycarbonate based on bisphenol A having a weight-average molecular weight ($\overline{M}_w$) according to GPC of 18,000 g/mol.

Component B

Polyethylene terephthalate

The polyethylene terephthalate has an intrinsic viscosity IV of 0.74 cm$^3$/g and an isothermal crystallisation time at 215° C. of about 4.2 minutes.

The intrinsic viscosity is measured in phenol/o-dichlorobenzene (1:1 parts by weight) at 25° C.

Determination of the isothermal crystallisation time of PET by the DSC method (differential scanning calorimetry) is carried out using a PERKIN ELMER DSC 7 differential scanning calorimeter (weighed portion about 10 mg, perforated A1 tray) with the following temperature program:

1. heating from 30° C. to 290° C. at 40° C./minute,
2. isothermal for 5 minutes at 290° C.,
3. cooling from 290° C. to 215° C. at 160° C./minute,
4. isothermal for 30 minutes at 215° C. (crystallisation temperature).

The evaluation software is PE Thermal Analysis 4.00.

Component C1

ABS graft polymer, prepared by emulsion polymerization, having a rubber content of 50 wt. % and a A:B:S ratio of 15:45:50 and an acrylonitrile:styrene ratio of 30:70.

Component C2

Graft polymer of 84 parts by weight of a copolymer of styrene and acrylonitrile in a ratio of 73:27 with 16 parts by weight of crosslinked polybutadiene rubber, prepared by mass polymerization.

Component C3

Paraloid® EXL 2600: MBS (methyl methacrylate-grafted butadiene-styrene rubber, core-shell-structure having a glass transition temperature of −80° C.) from Rohm und Haas, Antwerp (Belgium).

Component C4

Metablen® S2001, methyl methacrylate-grafted silicone-butyl acrylate composite rubber from Mitsubishi Rayon Co., Ltd., Tokyo (Japan) core-shell-structure.

Component D
Bisphenol A-based oligophosphate

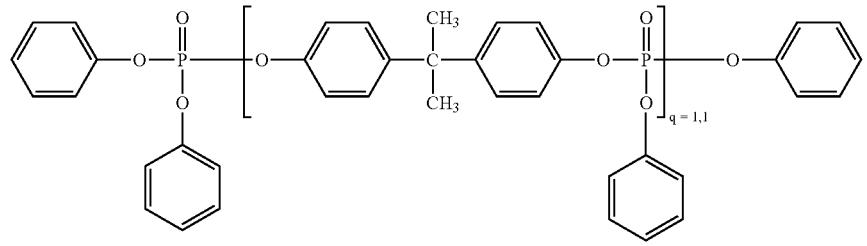

Component E

Blendex® 449, Teflon masterbatch of 50 wt. % styrene-acrylonitrile copolymer and 50 wt. % PTFE from GE Specialty Chemicals, Bergen op Zoom (Netherlands).

Component F1/F2

Pentaerythritol tetrastearate (PETS) (F1)

Phosphite stabiliser (F2)

The stress cracking behavior (ESC behavior) is tested on rods measuring 80 mm×10 mm×4 mm. A mixture of 60 vol. % toluene and 40 vol. % isopropanol is used as the test medium. The test specimens are pre-stretched by means of a circular arc template and the time to failure by breaking in that medium is determined as a function of the pre-stretching. The maximum pre-stretching at which no failure by breaking occurs within 5 minutes is assessed.

The decline in ESC behavior at higher processing temperatures is evaluated as follows: test rods measuring 80 mm×10 mm×4 mm are produced at 240° C. and 300° C. on a Arburg 270 E injection molding machine. The rods are pre-stretched with a bending elongation of 2.4%, are exposed at room temperature to a bath of rapeseed oil, and the time to failure by stress cracking is determined in both cases.

The decline in ESC behavior is calculated as (time to failure at 240° C.−time to failure at 300° C.)/(time to failure at 240° C.).

The notched impact strength $a_k$ is determined in accordance with ISO 180/1 A.

The elongation at tear is determined in the tensile test according to ISO 527.

The behavior in fire was measured according to UL-Subj. 94 V on rods measuring 127 mm×12.7 mm×1.5 mm.

Determination of the dimensional stability under heat according to Vicat B is carried out in accordance with DIN 53 460 (ISO 306) on rods measuring 80 mm×10 mm×4 mm.

In order to determine the weld line strength, the impact strength is measured at the weld line of test specimens measuring 170×10×4 mm and injection molded at both sides, in accordance with ISO 179/1U.

The melt viscosity is determined at 260° C. and a shear rate of 1000 $s^{-1}$ in accordance with DIN 54 811.

A summary of the properties of the composition according to the invention, or of test specimens obtained therefrom, is given in Table 1.

TABLE 1

| Molding compositions and their properties | | | | | | | | | | | |
|---|---|---|---|---|---|---|---|---|---|---|---|
| | 1 | C1 | C2 | 2 | 3 | C3 | C4 | 4 | 5 | C5 | C6 |
| Components [pts. by wt.] | | | | | | | | | | | |
| A1 (PC1) | — | — | — | — | 70.0 | — | — | — | — | — | — |
| A2 (PC2) | 70.0 | 70.0 | 70.0 | 70.0 | — | — | — | 72.0 | 67.0 | 62.0 | 57.0 |
| A3 (PC3) | — | — | — | — | — | 70.0 | — | — | — | — | — |
| A4 (PC4) | — | — | — | — | — | — | 70.0 | — | — | — | — |
| B (PET) | 7.0 | 7.0 | 7.0 | 7.0 | 7.0 | 7.0 | 7.0 | 5.0 | 10.0 | 15.0 | 20.0 |
| C1 (emulsion ABS) | — | 9.0 | — | — | — | — | — | — | — | — | — |
| C2 (mass ABS) | — | — | 9.0 | — | — | — | — | — | — | — | — |
| C3 (MBS) | — | — | — | 9.0 | — | — | — | — | — | — | — |
| C4 (Metablen S2001) | 9.0 | — | — | — | 9.0 | 9.0 | 9.0 | 9.0 | 9.0 | 9.0 | 9.0 |
| D (BDP) | 12.5 | 12.5 | 12.5 | 12.5 | 12.5 | 12.5 | 12.5 | 12.5 | 12.5 | 12.5 | 12.5 |
| E (Blendex 449) | 1.0 | 1.0 | 1.0 | 1.0 | 1.0 | 1.0 | 1.0 | 1.0 | 1.0 | 1.0 | 1.0 |
| F1 (PETS) | 0.4 | 0.4 | 0.4 | 0.4 | 0.4 | 0.4 | 0.4 | 0.4 | 0.4 | 0.4 | 0.4 |
| F2 (phosphite stabiliser) | 0.1 | 0.1 | 0.1 | 0.1 | 0.1 | 0.1 | 0.1 | 0.1 | 0.1 | 0.1 | 0.1 |
| Properties | | | | | | | | | | | |
| Notched impact strength [kJ/m²] | 55 | 15 | 8 | 43 | 55 | 48 | 8 | 57 | 43 | 12 | 10 |
| Vicat B 120 [° C.] | 103 | 102 | 105 | 101 | 103 | 102 | 101 | 102 | 100 | 99 | 98 |
| Melt viscosity (260° C./1000 $s^{-1}$) [Pas] | 211 | 267 | 192 | 236 | 223 | 168 | 91 | 209 | 184 | 167 | 148 |
| ESC behavior [%] | >3.2 | >3.2 | >3.2 | >3.2 | >3.2 | 2.2 | 0.6 | >3.2 | >3.2 | >3.2 | >3.2 |
| ESC decline (240° C. → 300° C.) [%] | 63 | 79 | — | 56 | — | — | — | — | — | — | — |
| Elongation at tear [%] | 117 | 85 | 21 | 121 | 117 | 92 | 28 | 116 | 122 | 115 | 35 |

TABLE 1-continued

Molding compositions and their properties

| | 1 | C1 | C2 | 2 | 3 | C3 | C4 | 4 | 5 | C5 | C6 |
|---|---|---|---|---|---|---|---|---|---|---|---|
| Weld line strength [kJ/m$^2$] | 24 | 11 | 7 | 42 | 28 | 20 | 14 | 32 | 20 | 19 | 16 |
| UL94 V test at 1.5 mm | V-0 | V-0 | V-0 | V-0 | V-0 | V-0 | V-0 | V-0 | V-0 | V-1 | V-1 |

C = comparison
n.b. = not broken

Table 1 shows that:
1.) Only those molding compositions which contain as graft polymer a graft polymer having a MMA-containing shell possess adequate notched impact strength, weld line strength, elongation at tear and processing stability (measured by the ESC decline at high processing temperatures).
2.) Although the melt flowability naturally improves when polycarbonates having a low average molecular weight are used, the notched impact strength, ESC behavior, elongation at tear and weld line strength fall. When polycarbonates having a weight-average molecular weight <25,000 g/mol. are used, those mechanical properties no longer meet the demands of the intended fields of application.
3.) As the PET/PC ratio increases, the notched impact strength, elongation at tear, weld line strength, dimensional stability under heat and, above all, the flame resistance fall. On the other hand, the melt flowability increases while the resistance to chemicals remains the same. PET contents of from 5 to 10 wt. % therefore prove to be particularly advantageous.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising
   A) from 40 to 90 parts by weight of aromatic poly(ester) carbonate having a weight-average molecular weight $M_w \geq 25,000$ g/mol.,
   B) from 0.5 to 12 parts by weight of polyalkylene terephthalate,
   C) from 1 to 20 parts by weight of graft (co)polymer consisting of from 10 to 90 wt. % (based on the weight of the graft (co)polymer) of a graft base having a glass transition temperature below 0° C., and from 90 to 10 wt. % (based on the weight of the graft (co)polymer) of polymerized vinyl monomers as a grafted phase, the vinyl monomers containing at least 20 wt. % (based on the weight of the grafted phase) of acrylate monomers,
   D) an oligomeric organic phosphonic acid ester or from 2 to 20 parts by weight of an oligomeric organic phosphoric acid ester, and
   E) from 0 to 1 part by weight of fluorinated polyolefin,
the sum of the parts by weight of all the components A) through E) being 100.

2. The composition according to claim 1, wherein the aromatic poly(ester) carbonate has a $\overline{M}_w > 26,000$ g/mol.

3. The composition according to claim 1, wherein the polyalkylene terephthalate has an intrinsic viscosity $\leq 0.8$ cm$^3$/g.

4. The composition according to claim 1, wherein the graft base is at least one member selected from the group consisting of diene rubbers, copolymers of diene rubbers, EP(D)M rubbers, acrylate rubbers and silicone-acrylate composite rubbers.

5. The composition according to claim 1, wherein the vinyl monomers are at least one member selected from the group consisting of vinyl aromatic monomers, vinyl aromatic monomers substituted on the ring, (meth)acrylic acid (C$_1$–C$_8$)-alkyl esters, vinyl cyanides and derivatives of unsaturated carboxylic acids.

6. The composition according to claim 1, wherein the amount of acrylate monomer is at least 50 wt. %.

7. The composition according to claim 1, wherein the amount of acrylate monomer is at least 75 wt. %.

8. The composition according to claim 1, wherein component D conforms to formula (IV)

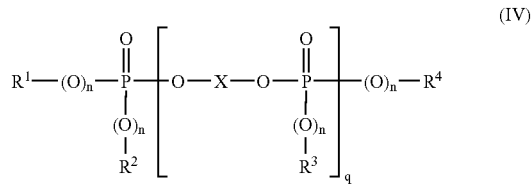

wherein
R$^1$, R$^2$, R$^3$ and R$^4$ independently represent C$_1$- to C$_8$-alkyl, or C$_5$- to C$_6$-cycloalkyl, C$_6$- to C$_{20}$-aryl or C$_7$- to C$_{12}$-aralkyl each optionally substituted by alkyl,
n, independently one of the others represents 0 or 1,
q is 0.5 to 30, and
X represents a mono- or poly-nuclear aromatic radical having 6 to 30 carbon atoms, or a linear or branched aliphatic radical having 2 to 30 carbon atoms, which may be OH-substituted and may contain up to 8 ether bonds.

9. The composition according to claim 8, wherein q is 1 to 5.

10. The composition according to claim 9, wherein q is 1 to 2.

11. The composition according to claim 8, wherein X represents a member selected from the group consisting of

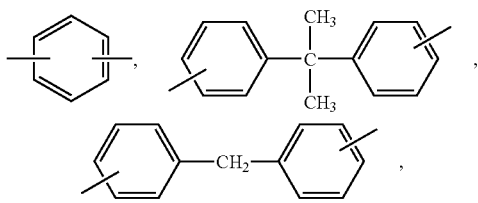

-continued

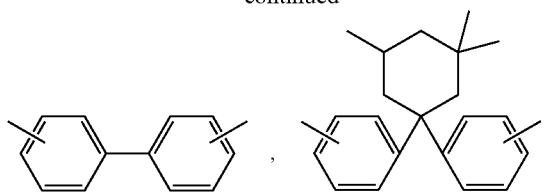

12. The composition according to claim 11, wherein X is a derivative of hydroquinone, resorcinol or bisphenol A.

13. The composition according to claim 1, containing
from 50 to 80 parts by weight of component A),
from 1 to 10 parts by weight of component C),
from 2 to 15 parts by weight of component D).

14. The composition according to claim 1, containing from 5 to 10 parts by weight of component B).

15. The composition according to claim 1, wherein Component B) is polyethylene terephthalate.

16. The composition of claim 1 wherein the graft (co) polymer has a core-shell morphology.

17. A molded article comprising the composition of claim 1.

18. A thermoplastic molding composition comprising
A) from 40 to 90 parts by weight of aromatic poly(ester) carbonate having a weight-average molecular weight $M_w \geqq 25{,}000$ g/mol.,
B) from 0.5 to 12 parts by weight of polyalkylene terephthalate,
C) from 1 to 20 parts by weight of graft (co)polymer consisting of from 10 to 90 wt. % (based on the weight of the graft (co)polymer) of a graft base having a glass transition temperature below 0° C., and from 90 to 10 wt. % (based on the weight of the graft (co)polymer) of polymerized vinyl monomers as a grafted phase, the vinyl monomers containing at least 20 wt. % (based on the weight of the grafted phase) of acrylate monomers,
D) from 2 to 20 parts by weight of an oligomeric organic phosphoric acid ester,
E) from 0 to 1 part by weight of fluorinated polyolefin, and
F) from 0 to 10 parts by weight of at least one additive selected from the group consisting of lubricants, mold-release agents, nucleating agents, antistatic agents, stabilisers, colorants, fillers, reinforcing agents, flame-proofing agents other than component D), and flameproofing synergists, the sum of the parts by weight of all the components A) through F) being 100.

19. A molded article comprising the composition of claim 18.

20. The composition of claim 18 wherein the graft (co) polymer has a core-shell morphology.

* * * * *